United States Patent [19]

Ibar

[11] Patent Number: 5,705,201
[45] Date of Patent: Jan. 6, 1998

[54] APPARATUS FOR CONTROLLING GAS ASSISTED INJECTION MOLDING TO PRODUCE HOLLOW AND NON-HOLLOW PLASTIC PARTS AND MODIFY THEIR PHYSICAL CHARACTERISTICS

[76] Inventor: Jean-Pierre Ibar, 306 Carter St., New Canaan, Conn. 06840

[21] Appl. No.: 522,615

[22] Filed: Sep. 1, 1995

[51] Int. Cl.$^6$ .................................................. B29C 42/16
[52] U.S. Cl. ......................... 425/130; 425/143; 425/144; 425/145; 425/432; 425/546; 425/456; 264/69; 264/572
[58] Field of Search ................... 425/456, 432, 425/552, 567, 143, 144, 145, 149, 546, 436, 424, 130; 264/69, 570, 572

[56] References Cited

U.S. PATENT DOCUMENTS

| | | | |
|---|---|---|---|
| 4,870,313 | 9/1989 | Hirama et al. | 310/320 |
| 4,955,804 | 9/1990 | Martell et al. | 425/552 |
| 4,976,900 | 12/1990 | Tsutsumi | 425/552 |
| 5,069,840 | 12/1991 | Arnott | 264/69 |
| 5,118,455 | 6/1992 | Loren | 264/572 |
| 5,266,246 | 11/1993 | Johnson et al. | 425/144 |
| 5,482,669 | 1/1996 | Shah | 264/572 |
| 5,520,862 | 5/1996 | Face, Jr. et al. | 264/69 |

Primary Examiner—Jay H. Woo
Assistant Examiner—Iurie A. Schwartz
Attorney, Agent, or Firm—Notaro & Michalos P.C.

[57] ABSTRACT

An apparatus and method includes a mold which defines a mold cavity with an inlet through which a molten, moldable material can pass into and/or through the mold cavity. A feeder for preparing the molten, moldable material, is spaced from the mold and expels the material to the mold cavity or to an accumulator connected to the mold cavity. A mechanism for controlling the temperature of the material in the feeder, accumulator, and the mold, as well as at least one gas injection unit with controls for the gas before, during and after its injection into the mold cavity and/or into gas channels located within and/or around the mold cavity are provided. A closed loop regulating system easily adjusts and regulates the gas flow and monitors the average gas pressure of the injected gas according to a programmed conditioning signal. The gas injection unit has relief valves and gas tanks. Also included in the gas injection unit is gas purging/venting equipment capable of producing a vacuum in the mold cavity and/or in the gas channels and/or inducing a differential of pressure creating flow of pressurized gas. Pressure, temperature and vibration probes are located in the mold assembly and in the gas injection unit(s) and are connected to transducers controlled by a computer. A controlled amount of volatile chemicals can be mixed with the inert gas of the gas injection unit. The apparatus includes one or more vibration devices to induce controlled high or low frequency low or high amplitude vibrations in the gas flowing. A mechanism controls the timing of activation of vibration during the filling, packing and cooling stages of the molding operation.

15 Claims, 4 Drawing Sheets

APPARATUS FOR CONTROLLING GAS ASSISTED INJECTION MOLDING TO PRODUCE HOLLOW AND NON-HOLLOW PLASTIC PARTS AND MODIFY THEIR PHYSICAL CHARACTERISTICS

FIELD OF THE INVENTION

This invention pertains to injection molding methods and apparatus for modifying the physical properties of injection molded polymeric parts using controlled vibrated air and gas-assisted pressure in addition to and in synchronization with the other conventional injection molding parameters. The method and apparatuses apply to both hollow and non-hollow plastic parts.

BACKGROUND OF THE INVENTION

It is well known to those skilled in molding polymeric materials that such defects as weld lines, sink marks, and warpage of the final part are caused by melt fronts collision, unbalanced flow, uneven cooling, non-uniform internal stress and inhomogeneous nucleation and growth of crystals as the part solidifies. Varying the processing parameters (e.g., temperature, pressure, flow rates, filling and packing time in the case of injection molding etc.) can result in the modification of the molded part outlook and final product's physical properties, but the modifications are often slight and not quantified, and they also rely, to a large extent, upon the expertise of the molding operator who uses his experience and art to determine the molding processing parameters, the so-called "processing window". Unfortunately, more often than less, the conventional wisdom for a good processing window involves increasing the clamp tonnage, sometimes as high as 25–50,000 PSI of pressure, which substantially contributes to the price of the injection molding equipment.

Some new molding techniques have surfaced in the literature which make use of specific pressure (and shear induced) profiles prior to or during molding in order to control the flow pattern and/or the internal structure and morphology of plastic matter as it is being shaped. Among all the patents surveyed in that regard, one can distinguish between those processes which make use of vibration and oscillation of melts from those which simply control, in a specific way, the filling and packing and cooling parameters, i.e. shot size and speed of injection, holding and packing pressure, melt and mold temperature, filling and packing time etc. For instance, in the non-vibration process category, U.S. Pat. No. 4,150,079 by L. F. Chang discloses a method and apparatus for controlling haze and crystallization in thermoplastic materials, such as Polyethylene terephtalate (PET), by controlling the pressure during cooling, from high pressure to low pressure to induce a greater amount of crystallization, and from low pressure to high pressure to obtain a significant lesser amount of crystallization. For the later, the pressure is drastically increased at a predetermined temperature and to a high level (20,000 PSI). The apparatus for suppressing or inducing crystallization by controlled pressure variation is hydraulically based comprising hydraulic cylinder arrangement, accumulator, and pressurizing rod, directly pressurizing the molten plastic.

The technique of injection-compression molding, for instance described in PCT application PCT/US90/00843 by S. M. Maus and G. J. Gallo, (also refer to Modern Plastics, June 1988, pp. 38–40) should be treated among the category of non-vibrational processes which modify the molding operation, from the filling stage to final ejection of the part, to account for the influence of the molding parameters on the final quality and performance of the molded article, in this case the internal stresses and resulting birefringence of compact disks. The Maus-Galic process uses an "adaptive" mold cavity with a predetermined resiliency within the moldset, to automatically control melt pressure and densification during mold packing. In other variations of the injection-compression, pressure in the cavity is controlled from both ends, from hydraulics connected to the movable half of the mold assembly, and from the quantity of plastic injected in the mold. In essence, the cavity size is made controllably adaptive, to the extent as to allow the plastic to relax more freely the molding stresses as it fills a larger mold cavity than its final dimension. The final cavity dimensions are adjusted in the course of molding, at a strategic time in the cycle, to have the part conform to the geometrical specifications.

A molding technique known as gas-assisted injection molding is increasingly used in the molding industry to produce hollow thermoplastic parts. It is a low-pressure variation of conventional injection molding, which can be categorized among the non-vibrational processes, with benefits ranging from lower clamp tonnage, lower injection pressures, uniform filling and packing within cavity (resulting in reduced stress, reduced warpage and reduced sink marks), and improved surface appearance and aesthetics. The injection of molten plastic into a mold is assisted by a pressurized gas. The purpose of the gas is to push the plastic into the extremities of the tool while hollowing out the thicker sections in the part and packing out the molded part. Gas pressure holds the plastic material against the mold surface during cooling. Several variations of gas-assisted molding are used by the plastics industry. They are differentiated by the method and location of the gas injection into the polymer melt. The gas can be injected through the nozzle, runner system, sprue, or directly into the mold cavity under a constant pressure or a constant volume. These gas injection methods are believed to be disclosed in various U.S. patents, and are described in many publications, e.g.:

P. J. Zuber, "*Relationship of Materials and Design to Gas-Assist Injection Molding Application Development*", Molding 95, Fifth International Conference and Exhibits, Mar. 27–29 1995.

Gas-Assist Injection Molding, "*Design and Processing guide for GE Resins*", a GE Plastics publication.

H. Eckardt, Annual Conference, SPI Structural Division, 18, 57.

S. Shah and D. Hlavaty, ANTEC 91 Reprints, 1479 (1991).

S. Shah, "Gas Injection Molding:Current Practices", ANTEC 91 Reprints, 1494 (1991).

K. Beattie, "*Developments in Cinpres Gas Injection Nozzles*", Molding 95, Fifth International Conference and Exhibits, Mar. 27–29 1995.

P. L. Medina, L. S. Turng, V. W. Wang, "*Understanding and Evaluating Gas-Assisted Injection Molding Applications via Computer Simulation*", paper presented in the Structural Plastics 19th Annual Conference, Society of the Plastics Industry, Atlanta, Ga., April 1991.

P. L. Medina, L. S. Turng, "*Utilizing Gas Flow Simulation to Design Gas-Assisted Injection Molded Product*", Molding 95, Fith International Conference and Exhibits, Mar. 27–29 1995.

As far as vibration based processes are concerned, there are three categories of patented processes using vibration to modify the molding process and/or the properties of molded materials.

The common practical feature among the patents of the first category is their use of mechanical shaking-oscillation or ultrasonic vibration devices to homogenize and increase the density of the material molded, either in the liquid stage or in the solidifying stage, either at a macroscopic or microscopic level. Examples of the first category are:

U.S. Pat. Nos. 4,288,398, 3,298,065 and 4,925,161.

Also refer to:

P. S. Allan et al., *Composites Manufacturing*, The Wolfson Center of Materials Processing, Brunel, The University of West London, Uxbridge, Middlesex, pp. 80–84 (June 1990).

The second category of patents and processes using vibration is based on the fact that material rheology is a function of vibration frequency and amplitude as well as temperature and pressure. This can be put to practical use to influence diffusion end rate sensitive processes which depend on viscosity and relaxation kinetics, such as nucleation and growth of crystals and orientation. Examples of patents of the second category are:

U.S. Pat. Nos. 4,469,649 and 4,919,870 U.S. patent application Ser. No. 07/880,926, 08/124,147, and 08/138,673 and EPO application 87402845.7; all by Ibar.

Also refer to the following articles:

J. P. Ibar, "*Rheomolding: A New Process to Mold Polymeric Materials*", Polym.-Plast. Technol. Eng.,17(1), 11 (1981).

J. P. Ibar, *Modern Plastics*, vol. 25 No. 1,85 (1995).

G. L. Slonimskii, et al, *Vysokomol. Soyed*; A16, 1, 232 (1974), and

S. N. Nurmukhametov, et al, *Mekhanika Polimerov*; No. 4, 579 (1976).

As an illustration of the concepts used in these processes of the second category, the last two articles demonstrate the effect of high frequency vibration on accelerating the relaxation rate in amorphous and semi-crystalline materials, which can practically be used to reduce or eliminate internal stresses in plastic materials by accelerating the return to equilibrium state.

In a third category, vibration is essentially used to increase the throughput of melt flow through dies by reduction of the friction at the wall interface between the melt and the barrel. Refer to the following publications:

J. Casulli, J. R. Clermont, A. Vonziegler and B. Mena, "*The Oscillating Die: A Useful Concept in Polymer Extrusion*" Polym. Eng. Sci.; 30 (23), 1551 (1990).

C. M. Wong, C. H. Chen and A. I. Isayev, "*Flow of Thermoplastics in an Annular Die under Parallel Oscillations*", Polym. Eng. Sci.; 30 (24), 1574 (1990).

B. Mena, O. Manero and D. M. Binding, "*Complex Flow of Visco-elastic Fluids through Oscillating Pipes: Interesting Effects and Applications*", J. of Non-Newtonian Fluids Mechanics; 5, 427 (1979); and by same author, Rheol. Acta; 16, 573 (1977). Ibid, 17, 693 (1978).

U.S. patent application Ser. No. 07/880,926) by Ibar (this application of vibration can also be beneficial to flow through vibrated runners in injection molding, especially in applications involving thin wall technology).

In the first category of processes and apparatuses making use of vibration, the technique is one of shaking or local micro-shaking in the case of ultrasonic vibration. In some patents of the first category, the initial states of the materials treated are granules or pellets and not bulk materials and the vibration is applied to this state. The result of applying vibration in these circumstances is to compact the granules and powders and to combine the effect of heat and mechanical shaking so as to avoid the trapping of bubbles between the granules and thereby obtain a more homogeneous product with better mechanical properties. The shaking can also be applied in the melt, for instance to decrease the number of bubbles in the melt either by increasing the contact between an interface and products to be mixed, or by generating a certain amount of heat so as to pre-heat the material thereby rendering it softer and more moldable. This can be practically used to eliminate or strengthen weld lines such as shown in U.S. Pat. No. 4,925,161 of P. Allen and M. Bevis. This process relates to an injection molding technique claimed to eliminate part defects and increase strength, particularly with fiber-reinforced materials, by use of multiple gates and injection pistons to oscillate the melt back and forth in the mold to achieve desired orientation effects across weld lines. In its simplest form, the Allen and Bevis process splits the melt into two identical feeds. Each feed is equipped with its own packing chamber and piston, and is capable of supplying pressure to the cavity independently of the others. During the molding cycle, the molten polymer is injected from the barrel into the mold through one or both piston channels in the processing head, depending on the desired program. Once the mold is filled the pistons are actuated in a selected sequence. The piston action first develops fluctuating melt pressure that moves and shears the melt in the cavity and gate areas. This results in actually shaking the melt fronts to increase the interface area and eliminate the air trapped between the two colliding fronts. Then the pistons are moved to apply compression-decompression forces to the melt. New material is introduced to compensate for shrinkage and voids.

Another application of melt oscillation to create orientation effects in melts containing fibers (or LCPs) is used by Klockner Ferromatik Desma of Germany, the so-called "Push-Pull" technique, which is apparently not covered by any patent. This process is also based on oscillation of the melt in the mold to improve part quality, and uses a molding machine with twin injection units, such as are used in multicomponent or two-color work, along with software modifications to control movement of the injection units. After filling a two-gated mold, one injection screw advances while the other retracts and vice versa, creating the oscillation of melt in the cavity. Substantial benefits of the technique are said to be enhanced fiber-reinforcement effect and reduction of defects from internal weld lines.

For processes using ultrasonic energy, the objective is to alter the kinetics of nucleation and growth of crystals in the melt to obtain more homogeneous solidified parts. U.S. Pat. No. 4,288,398 by Lemelson describes an apparatus and method for controlling the internal structure of plastics in a mold by application of ultrasonic energy to the solidifying material to effect beneficial control of the crystalline structure formed thereof upon solidification. Ultrasonic vibrations may be utilized per se or in combination with other forms of energy applied to the solidifying material so as to orient or otherwise control the grain or crystalline structure thereof for improving the strength and other physical characteristics of the solidified article. U.S. Pat. No. 3,298,065 by J. W. Pendleton also describes an ultrasonic process to modify the structure of crystallizable thermoplastic materials. In one embodiment of this invention air-jet monowhistles, consisting of a resonant chamber and an exponential horn, are directed at a tubular bubble being blown-extruded as it passes the area above the annual orifice and below the frost line. The objective is to break down the large spherulites by ultrasonic energy resulting in improve clarity of the blown films.

In general, for the vibrational processes of the first category, the frequency and amplitude of vibration is not changing during the treatment, and this feature distinguishes them from the second category of vibrational treatment referred to in U.S. Pat. No. 4,469,649 for instance. There is an exception: for those patents of the first category which want to optimize the effect of vibration during molding, the frequency of vibration is varied for the system to stay at resonance. The reason is simple; the mold and the material constitute a mechanical system in which the amplitude of vibration transmitted is a maximum when the frequency is the frequency of the mechanical system, this latter quantity being a function of the stiffness of the system and hence of its temperature. Mechanical shaking may induce a certain degree of heating in the material being treated, or the change of mold temperature as it cools change the stiffness of the mechanical system. The result is the variation of the resonance frequency of the system and therefore a decrease of the effect of the compacting process. Some of the patents remedy this situation and vary the frequency of vibration during treatment in order to constantly remain on the resonance frequency of the mechanical system in order to optimize the effect of the treatment. These patents will still be referred to in the first category, the shaking category, although the frequency actually varies during the solidification in the mold.

U.S. Pat. No. 4,469,649 by Ibar is the seminal patent for a series of patents based on the same concept which provide a method and apparatuses for transforming the physical characteristics of a material by controlling the influence of theological parameters, particularly a method and apparatuses for molding by vibration (either mechanical or electrical) to enable the control or modification of the physical properties of the molded materials, notably their mechanical and optical properties. Ibar's process uses vibrational means for a frequency range of 5 to 3000 Hz in order to influence and/or tailor a change in state, either a transitional state (melting transition, glass transition) or a relaxation state, i.e. the internal friction related to viscosity and orientation. The U.S. Pat. No. 4,469,649 invention is a method of simulating the effect of cooling of plastics at a desired rate, for instance in order to improve orientational effects in three directions, by applying programmed variable vibrations which influence the state of relaxation. The process allows to kinetically freeze in plastic materials specific non-equilibrium states which benefit the physical properties. This is accomplished by crossing phase transitions at chosen given speed determined by the rate of change of theological parameters acting on the melt. Refer to J. P. Ibar, "*Improving Molding Through melt-flow oscillation*", *Modern Plastics*, vol. 25 No. 1,85 (1995) for additional information. The Ibar patent modifies the thermal mechanical history characteristics of a moldable plastic so as to produce a shaped article which exhibits, among other things, at least one of the following characteristics: an increase tensile strength and stiffness, an increase flexural strength and flexural stiffness, an increase impact strength, an increase weld line strength, an increase dimensional stability and a decrease in the number of voids and sink marks.

A careful study of the above references and patents clearly indicates how difficult and costly it is to practically apply the benefits of vibration according to any of the three types of invention and processed described. Furthermore, since the frequency range spans for the three categories from very low frequency (1 cycle/sec) to the ultrasonic range (1 million Hertz or more), it is unpractical to realize with a single simple apparatus the distinct benefits of the use of vibration for multi purposes, according to the practice that any invention among the three categories described above teaches. Said another way, it is unpractical to design a vibratory device which will work under all circumstances, from very low frequency high amplitude of vibration, to high frequency low amplitude vibrations obtained in the ultrasonic range. While the vibration of heavy molds or screws of injection molding feeders requires a lot of energy, is limited to low frequency and low amplitude to remain cost effective, the vibration of plastics through accumulators, although less expensive and well adaptable from the type of hydraulic circuitry encountered in the technology of injection or extrusion molding (U.S. patent application Ser. Nos. 8,138, 673 and 07/880,926), is only applicable to a limited shot size range for any given accumulator system, consisting of one or several piston(s) and a servo-valve. The vibration amplitude of the plastic is damped from the source of vibration, the piston, to the mold cavity where the shaped part is being packed under vibration. The duping coefficient is function of the weight vibrated making it more difficult for a given extra large mold shot size, to vibrate at any satisfactory level. Furthermore, all the parts of the molded object might not be vibrated with the same amplitude, depending on their location with respect to the source of vibration in the accumulator. Needless to say, the need of several systems for any given injection molding equipment to accommodate different mold capacity is inconvenient and costly.

In view of the above, the polymer molding industry would greatly welcome a molding apparatus and/or molding method which is capable of applying rapid and controlled changes of pressure, including vibrational pressure, during the molding of plastic materials by injection molding. This new molding apparatus and/or molding method should be easily adaptable to apply either low frequency high amplitude vibrations as well as high frequency low amplitude, either at constant or variable levels of frequency or amplitude, and it should allow to increases the level of control over the product's physical properties without being dependent upon the shot size or the geometrical shape of the product. Moreover, it would be an even more welcomed improvement if such a molding apparatus and/or method would result in a significant decrease of the cost of applying vibrational or non-vibrational treatment to improve the molding operation and impart control over the product's physical properties.

DEFINITIONS AND SPECIFICATIONS

As used herein, the term "controlled gas pressure" refers to the control of the mean pressure of the gas, as opposed to its local pressure at any given location of the cavity, which can be fluctuating due to the propagation of high frequency vibrations within the gas. In the context of the present invention, the mean pressure can be controlled to suddenly increase or decrease between two values, preferably chosen between 0.0001 torre and 10,000 PSI, and/or it can be ramped up or down according to a certain rate profile, and/or it can oscillate between two values at low frequency, preferably between 0.3 and 1,500 Hz, for an amplitude of oscillation comprised preferably between ±30% of the average value. Furthermore, in the context of the present invention, in addition to the mean pressure and density controlled changes, the gas is subjected to high frequency low amplitude acoustic waves in the ultra-sonic range created by vibrating devices embedded in the gas or in contact with the gas cavity. Preferably, the high frequency waves produced have energy between 50 and 500 W and their frequency ranges between 20,000 to 200,000 Hz.

As used herein, the term "gas state" refers to the state of velocity, density, pressure and temperature of the gas, submitted to high frequency vibrational waves. In a gas entrapped in a closed or open cavity, stationary waves of vibration are obtained under certain specific states of the gas, herein referred to as "resonant states", which correspond to the maximum of vibration power transmitted to the cavity. For a given cavity size and shape, the resonant frequencies depend on the velocity of the waves passing through it. The velocity of propagation is proportional to the square of the compressibility of the gas over its density. A change of the average pressure of the gas, at constant temperature and frequency of gas excitation, results in the motion of the stationary waves, which can be visualized as the progression of the fronts of maximum transversal amplitude of vibration along the surface of the cavity. The average pressure can be made to vary such as to synchronize the motion of the progressive waves with their wavelength to produce an endless motion of progressive waves towards only one direction of the cavity. This will be referred to herein as a "progressive state".

As used herein, the term "melt manipulation process file" refers to a given set of parameters defining the conditioning of all controlling signals during an injection molding cycle, i.e., temperature, frequency and power for the ultrasonic excitations, gas pressure profile, and in the case of pressure and shear oscillation, frequency, amplitude and/or phase of the sinusoidal signals, and the variation of those parameters with time and/or temperature during the cooling of the mold. These are all the reproducable parameters and/or conditions which, according to the invention, will have a predictable and recognizable effect and result in and on the molded article or product while in the mold and after it has left the mold.

SUMMARY OF THE INVENTION

Accordingly, one object of this invention is to provide a molding apparatus and/or method which imparts, at the same time and with one single operation control of the filling and packing stages within the mold cavity (resulting in reduced molded-in stress due to wall friction reduction, reduced warpage and reduced sink marks, improved surface appearance and aesthetics), and also control of the crystallization process and of the orientation of the crystallites and/or of amorphous regions in the product, as it cools in the mold, to enable the control or the modification of the physical properties of the molded materials, notably their mechanical and optical properties.

In the invention described herein, gas in a given state, and/or in given successive states, is used for several purposes: such as to vibrate the mold cavity, the runners and the gate and/or a network of air channels distributed around the cavity prior to and during the injection process, alter the filling pattern of molten plastic injected into the mold cavity through runners and gates filled with compressed gas, push molten material in the mold cavity during the filling stage and guide the flow to the desired locations, oscillate the molten polymer in the mold cavity in order to create orientational flow forces, compress or pack uniformly the part during the packing stage and apply a characteristic pressure profile during cooling, for instance to modify the nucleation and crystallization process and/or to increase the amount of free volume in the part and/or to induce 3-D orientational effects, and finally to vibrate the cooling melt at either low frequency, high frequency or any combination thereof, to obtain the benefits disclosed in other Patents such as: U.S. Pat. No. 4,150,079, U.S. Pat. No. 4,469,649, U.S. Pat. No. 4,288,398, U.S. Pat. No. 3,298,065 and U.S. Pat. No. 4,925,161. Further, gas is used in the invention described herein to tag the molded product for future characterization or recognition and/or to treat the polymer in the molten state with adjuvants added to the gas. Still further, gas with selected properties can be included and captured in the molded article to modify the behavior, e.g. allow future and controlled decomposition of the article, or act as an identification tool to "tag" the product.

This and other objects are achieved through the advent of a novel molding apparatus and/or a method of using the same. The novel apparatus includes, among other things, mold assembly with a mold which defines a mold cavity therein. This mold has an inlet or passage through which a molten, moldable material can pass into and/or through the mold cavity. The apparatus also includes all embodiments found on what is commonly referred to as "injection molding machines" by those skilled in the art of material molding. There are several types of injection molding machines which can be used in conjunction with the present invention, toggle activated ones, full hydraulics ones, full electrics ones, with reciprocal screws, with plunger etc. All models include common features which are used by the present invention such as at least one feeder for preparing a molten, moldable material. This feeder is spaced from the mold. The feeder includes a means for expelling the molten, moldable material through its outlet to the mold cavity or to an accumulator which itself is connected to the mold cavity through an outlet. Injection molding equipment also includes a means for controlling the temperature of the material contained within the feeder(s), the accumulator(s) and/or the mold. After reading this specification, those skilled in the art of molding will know what types of injection molding features should be used when practicing the invention. The preferred injection molding equipment and injection parameters will depend, in part, upon the product being manufactured, the resources of the manufacturer, and the mold being employed.

Also included in this apparatus is at least one gas injection unit with means to control the state of the gas or "gas state", before and during injection into the cavity and/or into gas channels located within and/or around the mold cavity. The gas injection unit is connected to the mold cavity and/or to the gas channels through at least one nozzle assembly. Also included in the apparatuses to practice this invention is a closed loop regulating system to easily adjust and regulate the gas flow and monitor the average gas pressure or "controlled gas pressure" of the injected gas according to a programmed conditioning signal. The gas injection unit is comprised of relief valves and gas tanks. Also included in the gas injection unit is a gas purging/venting equipment capable of producing a vacuum in the mold cavity and/or in the gas channels and/or inducing a differential of pressure creating flow of pressurized gas.

Also included in the apparatus for practicing this invention are pressure, temperature and vibration probes located in the mold assembly and in the gas injection unit(s) and connected to transducers controlled by a computer. This allows monitoring and controlling the timing sequence between injection of the moldable material and injection of the gas, and provides feed back to the closed loop regulating system.

Although the gas used in the gas injection unit is typically air to vibrate the air channels located outside and around the mold cavity where no contact with the molded material occurs during molding, and a pure inert gas such as nitrogen when the gas enters in direct contact with the molded material, also included in the apparatus of this invention is a mixing means to mix with the inert gas of the gas injection unit a controlled amount of volatile or reactive chemicals susceptible to influence the interaction(s) between the gas and the molded polymer and/or mark the finished product for future analysis, characterization and recognition.

Also included in the apparatus of the invention is temperature control means for controlling the temperature of the material within the injection molding equipment feeder(s), accumulator(s) and/or mold. Any suitable temperature controlling means can be employed when practicing this invention. Examples of suitable temperature control means include, without limitation, the implementation of the following: (a) hot and cold fluids such as oil or liquid or gaseous nitrogen circulated through passages in the injection machine, the accumulator, if there is one, the injection nozzle and/or the mold, (b) resistance cartridges positioned within the injection machine, the accumulator, the injection nozzle and/or the mold, (c) hot pipes inserted into the injection machine, the accumulator, the injection nozzle, and the mold, (d) fluid which is embedded in the injection machine, the accumulator, the injection nozzle and/or the mold and whose temperature can be controlled by dielectric means, and/or (e) temperature control of the gas. Those skilled in the art will be able to select the temperature controlling means which best suits their needs after reading this specification.

Also included in the apparatus of the invention is vibration means to induce controlled high frequency low amplitude vibrations in the gas flowing through the gas channels within and/or around the mold cavity and/or in the gas injected in the mold assembly, and timing means to control the timing of the activation of the vibration means during the filling, packing and cooling stages of the molding operation.

Other objects, aspects and advantages of the present invention will be apparent to those skilled in the art upon reading the specification and the appended claims which follow.

A more complete appreciation of the present invention, and many of the attendant advantages thereof, will be readily ascertained as the invention becomes better understood by reference to the following detailed description, when considered in connection with the accompanying figures briefly described below.

DETAILED DESCRIPTION OF THE INVENTION

The present invention pertains to apparatuses for molding and modifying the physical properties of moldable materials (e.g., polymers). It also pertains to methods of using such apparatuses.

Figure 1:
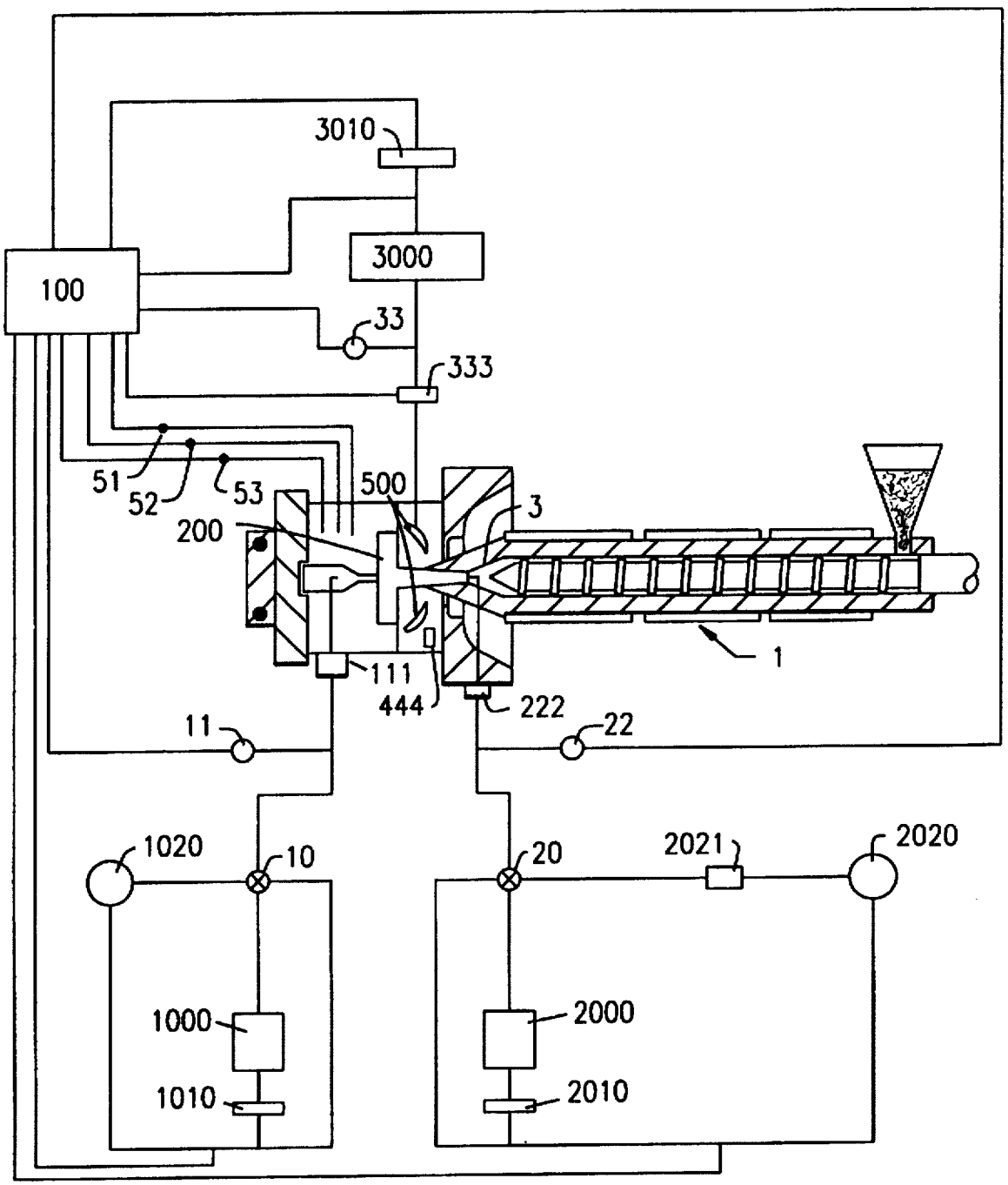
FIG. 1 is a schematic illustration of a molding apparatus including many of the features of the present invention.

FIG. 1 illustrates a molding apparatus designed in accordance with the present invention, wherein plastic melt in known injection molding equipment, is injected through a nozzle 3 into a mold cavity 200 via the injection molding equipment, and gas is introduced in the mold cavity 200 prior to, and/or during and/or after the plastic flow is started and/or completed, in a manner controlled by a program in a computer 100, through inlets located in the nozzle 3 and in the mold cavity 200, whereby the gas injected and compressed is submitted to high frequency vibrations produced by resonators 111, 222, and 444, located in the gas flow and/or in the proximity of the mold cavity where the gas is flowing and/or compressed. Pressure, temperature and vibration probes 11, 22, 51, 52, 53 are located in the mold assembly in the gas or air injection units 1000, 2000, and are connected to transducers controlled by computer 100. The apparatus includes a closed loop regulating system to adjust and regulate the gas flow and monitor the gas pressure of the injected gas according to a programmed conditioning signal stored in the memory of the computer. The apparatus also includes a gas mixing and vacuum chamber in each of 1020 and 2020 whereas the gas pressure regulation, the gas mixing and the gas purging/vacuum chamber are selectively activated by use of solenoid valves 10 and 20.

FIG. 1 also illustrates another feature of the molding apparatus designed in accordance with the present invention, wherein plastic melt is injected through nozzle 3 into the mold cavity 200 via the injection molding equipment 1, gas in a given state is introduced in the mold cavity prior, during or after the plastic flow is started and/or completed, in a manner controlled by a program in computer 100, through inlets located in the nozzle and in the mold cavity, and air is introduced in one or more air channels 500 located outside, around and in proximity to the mold cavity 200, whereby both the gas injected in the mold cavity and the air flowing and/or compressed in the air channels are submitted to high frequency vibrations produced by resonators 111, 222, 333 and 444 located in the gas and air channels and/or in proximity of the mold cavity, and whereby the pressure of the gas, the temperature of the gas and the frequency of vibration of the gas and air are monitored and programmed prior, during or after the plastic flow has started and/or is completed. The pressure, temperature and vibration probes 11, 22, 33, 51, 52, 53 located in the mold assembly and in the gas and air injection units 1000, 2000 and 3000, are used here as well as part of the feed back control system. The computer 100 includes a stored conditioning signal which determines the sequential events, when the air is vibrated in the air channels 500, when the gas is injected and vented in the mold cavity, under what pressure(s), at what frequency (ies) and for how long. As a variation of this embodiment of the present invention, the air flowing in the air runners is the same as the gas injected in the mold cavity and a single gas injection unit is connected to a manifold. Channels 500 may be chambers or multiple lines of a piping network.

FIG. 1 further illustrates another combination of a molding apparatus designed in accordance with the present invention, wherein plastic melt is injected through a nozzle into a mold cavity via an injection molding equipment and air is introduced in air channels located outside, around and in proximity to the mold cavity, whereby the air injected in the air channels is submitted to high frequency vibrations produced by resonators 333, 444 located in the air channels and/or in proximity of the mold cavity, and whereby the pressure of the air, the temperature of the air and the frequency of vibration of the air are monitored and programmed prior, during or after the plastic flow has started and/or is completed. Pressure, temperature and vibration probes 33, 51, 52, 53 are located in the mold assembly and in the air compression unit and are connected to transducers and a computer as part of the feed back control system. The computer includes a stored conditioning signal which determines the sequential events, when the air is vibrated in the air channels, under what pressure and temperature, at what frequency and for how long.

FIG. 1 also schematically shows the gas vibration unit of the molding apparatus designed in accordance with the present invention, whereby the outlet for the gas is connected to computer controlled relief valve, e.g. at 20, which let the gas exit the mold cavity and decompress according to a predetermined sequence and program. Also shown in FIG. 1, is a silencer chamber 2021 at the end of the exhaust.

Figure 2:
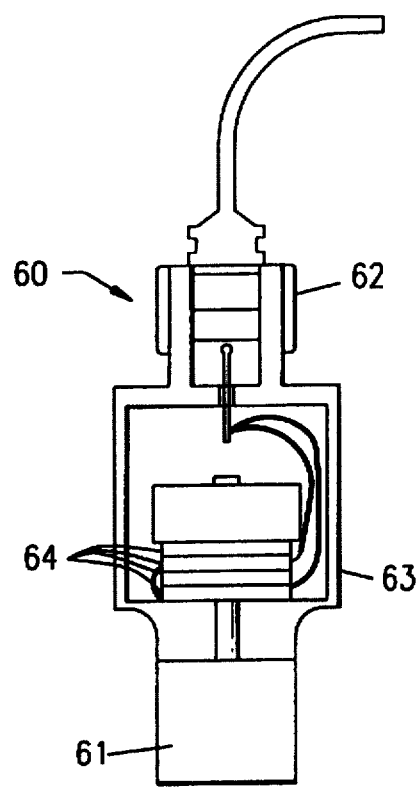
FIG. 2 is a partical elevational view of an air vibrating unit which can be used according to the present invention.

FIG. 2 is a schematic illustration of one embodiment of the air vibration unit of a molding apparatus designed in accordance with the present invention. The unit comprising a tubular resonator unit consisting of a high frequency cable connector 62, a transducer 63 made up of piezoelectric elements separated by metal sheets at and a tubular resonator 61, whereby the tubular resonator is inserted at determined locations in the mold assembly and/or in the gas or air flow before it enters the mold cavity and/or the air channels, such as at 111, 222, 333 and/or 444 in FIG. 1.

Figure 3:
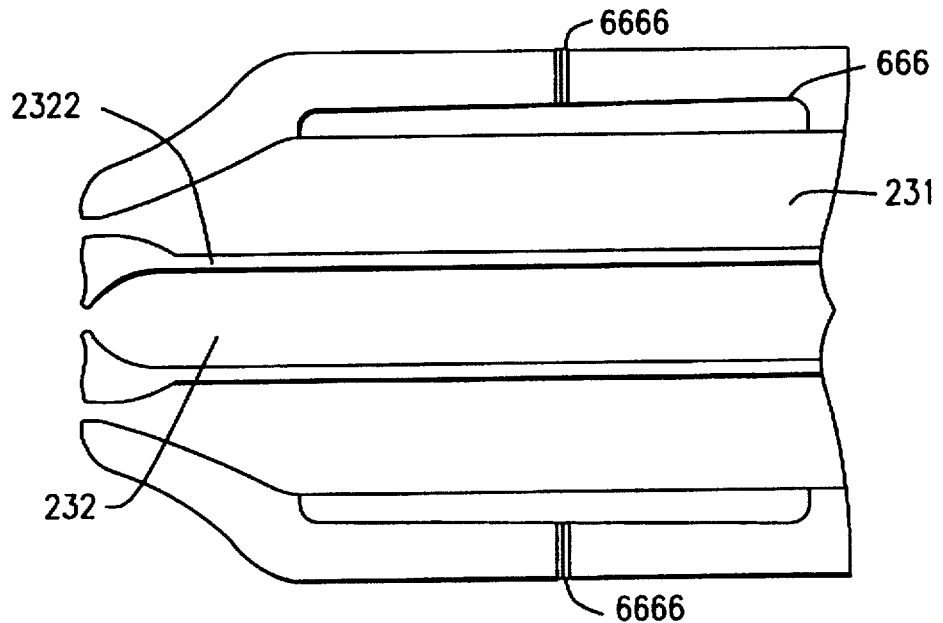
FIG. 3 is a view similar to FIG. 3 of another vibrating unit connection which can be used according to the present invention.

FIG. 3 is a schematic illustration of one embodiment of the gas vibration unit of a molding apparatus designed in accordance with the present invention, comprising a piezoelectric vibrating ring inserted inside the nozzle which injects the plastic material into the mold cavity, whereby the inlet and outlet for the gas injection are located within the nozzle assembly. 666 is the piezoelectric ring around the gas inlet. 6666 is an electrical (high frequency) cable connection to PC 100. 231 is a gas channel connected to gas injection units (2000) and which includes purge/vacuum and/or mixing units (2020) through switch valve 20 of FIG. 1. A polymer melt injection conduit 2322 and polymer melt 232 are directly connected to the chamber of injection molding equipment 1 in FIG. 1.

Figure 4:
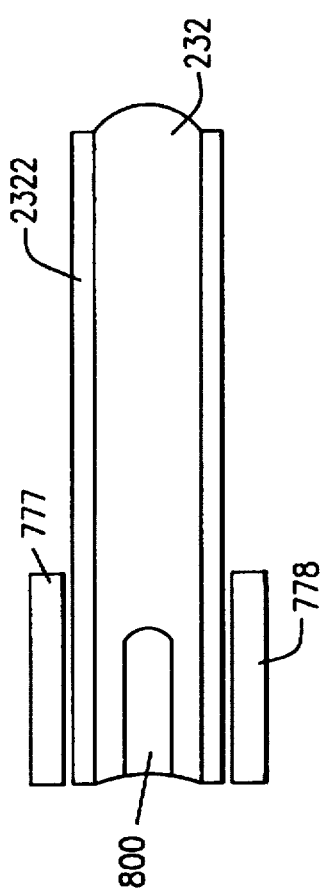
FIG. 4 is a partial sectional view of a still further embodiment of the invention.

FIG. 4 schematically illustrates an embodiment of the air vibration unit of a molding apparatus designed in accordance with the present invention whereby two tubular resonators 777 and 778 are vibrating in phase and across a specific location of the mold cavity as to form a local mechanical resonant system with the air bubble which cores out the solidifying part at that location. 232 is the polymer melt in contact with mold wall 2322. 800 is the gas bubble in the melt in communication with either gas injection unit 1000 or 2000 through valves 10 or 20.

Figure 5:
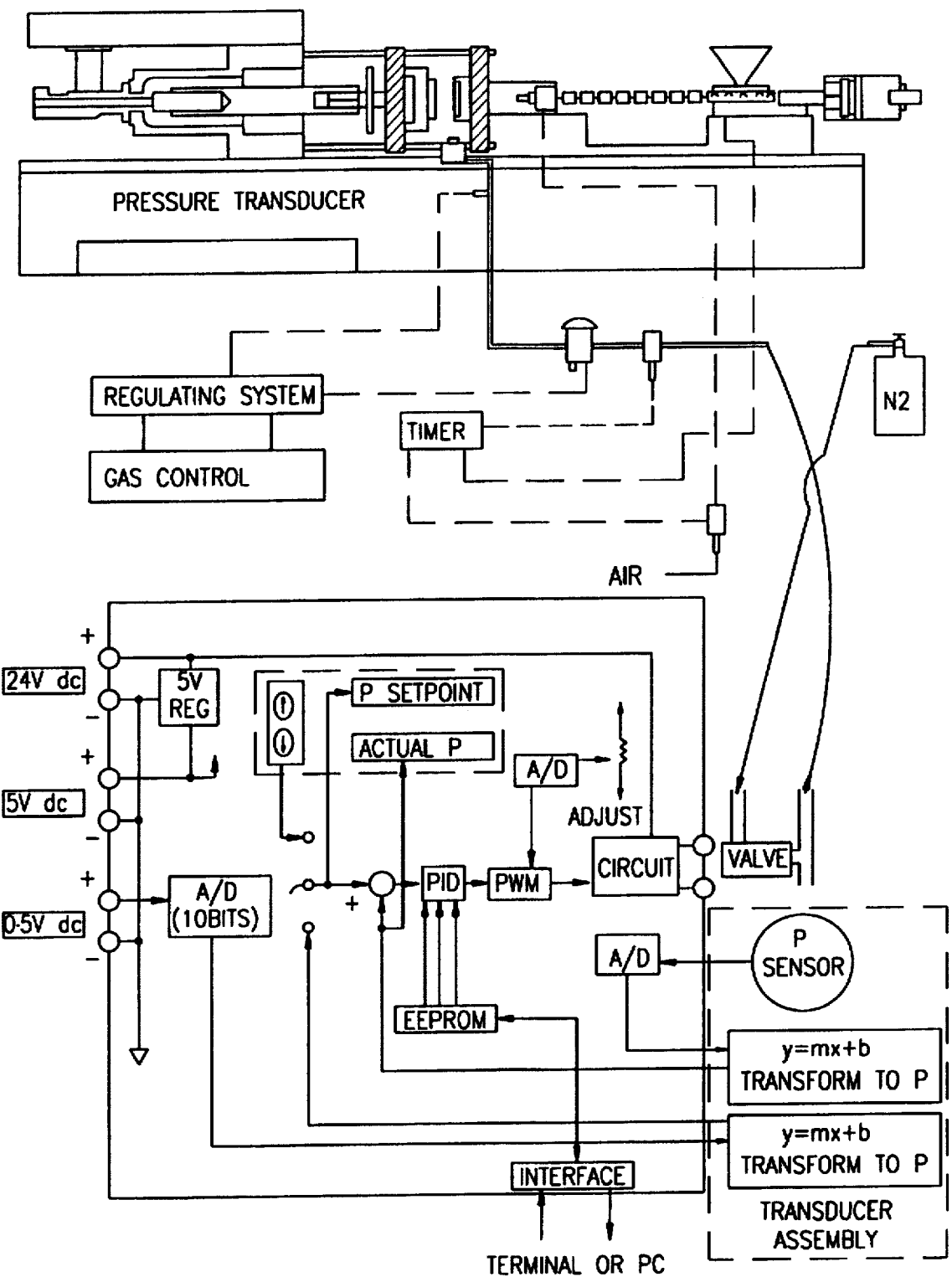
FIG. 5 is a schematic illustration of an additional embodiment of the present invention.

FIG. 5 is a schematic illustration of one embodiment of the gas vibration unit of a molding apparatus designed in accordance with the present invention, whereby the inlet for the gas is connected to a computer controlled (PID) electropneumatic proportional valve which lets the gas be injected in the mold cavity and compress according to a predetermined sequence and program.

Figure 6:
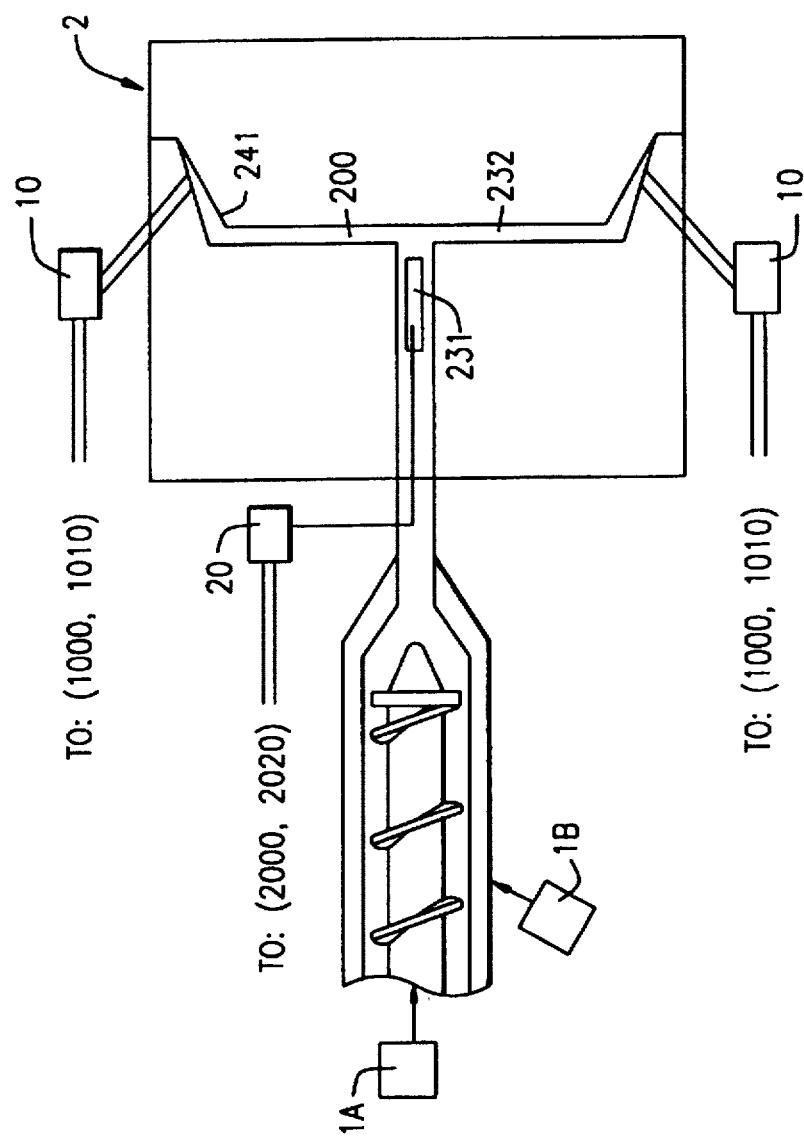
FIG. 6 is a partial view of a still further embodiment of the invention.

FIG. 6 is a schematic illustration of one embodiment of a molding apparatus designed in accordance with the present invention wherein two air injection units, operating with reciprocal gas pistons, are connected to the mold cavity through nozzles and the injected gas is oscillated at a low frequency of oscillation prior to and/or during the filling and packing of the plastic in the mold cavity according to a program which determines the frequency, amplitude and phase difference of the gas pistons as a function of the molding parameters. Gas bubbles 241, 231 are formed in the melt 232.

In greater detail, the apparatus encompassed by the present invention includes a mold 2 which defines a mold cavity 200, an injection molding unit 1 which can pass a molten, moldable material into or through the mold cavity through its inlet or passage 3, at least one gas injection unit 1000, 2000, 3000 with means to inject a gas and control its state with controllers, e.g. PID controllers for temperature and/or pressure 1010, 2010, 3010, during its injection into the cavity 200 and/or into gas channels 500 located within or around the mold cavity, and a computer 100 system 100 coordinating and regulating the injection and compression of the gas parameters and the injection of the material parameters. In the invention described herein, gas in a given state, and/or in given successive states, is used for several purposes: to vibrate the mold cavity and/or a network of air runners distributed around the cavity, alter the filling pattern of molten plastic injected into the mold cavity through runners and gates filled with compressed air, push molten material in the mold cavity during the filling stage and guide the flow to the desired locations, oscillate the molten polymer in the mold cavity in order to create orientational flow forces, compress or pack uniformly the part during the packing stage and apply a characteristic pressure profile during cooling, for instance to modify the crystallization process and/or to increase the amount of free volume in the part and/or to induce 3-D orientational effects, and finally to vibrate the solidifying polymer at either low frequency, high frequency or any combination thereof, to obtain benefits such as those disclosed in U.S. Pat. No. 4,150,079, 4,469, 649, 4,288,398 and 3,298,065 which are incorporated here by reference. Further, gas is used in the invention described herein to tag the molded product for future characterization or recognition and/or to treat the polymer in the molten state with adjuvants added to the gas. Gas may even be trapped in the finished article for future tagging or modification to the product. The gas injection unit is connected to the mold cavity and/or to the gas channels through at least one nozzle assembly. The gas injection unit includes a closed loop regulating system to easily adjust and regulate the gas flow and monitor the gas pressure of the injected gas according to a programmed conditioning signal. The conditioning signal, incorporated as a computer file stored in the computer, applies the teaching of U.S. Pat. Nos. 4,150,079, 4,469,649, 4,288,398 and 3,298,065, depending on the objectives sought for that particular material. Pressure, temperature and vibration probes are located in the mold assembly and in the gas injection unit and are connected to transducers controlled by the computer. This provides feed back to the closed loop regulating system to allow monitoring and controlling the timing sequence between injection of the moldable material and injection of the gas. The controls of the state of the gas in the cavity and/or of the air in the air runners outside the mold cavity during packing and especially filling, which is a very fast process, are done with use of feed-forward technology using digital filtering of the input channels and state transition methodology.

In order to practice the embodiments of the invention gas is introduced either prior to, during or after the plastic flow is started and/or completed, in a manner controlled by a program, through inlets located in the nozzle and in the mold cavity, and air is introduced in air channels located outside, around and in proximity to the mold cavity, whereby both the gas injected in the mold cavity and the air flowing and/or compressed in the air channels are submitted to high frequency vibrations produced by resonators located in the gas and air channels and/or in proximity of the mold cavity, and whereby the pressure of the gas, the temperature of the gas and the frequency of vibration of the gas and air are monitored and programmed prior to, during or after the plastic flow has started and/or is completed. The computer includes a stored conditioning signal which determines the sequential events, when the air is vibrated in the air channels, when the gas is injected and vented in the mold cavity, under what pressure(s), at what frequency(ies) and for how long. The apparatus is not limited to any specific mold design or configuration.

In another embodiment of the present invention, the gas inlet nozzle consists of a set of two coaxial rings disposed at the gate or inside the mold cavity, whereas the said rings are radially traversed by a set of matching small holes, and whereas the outside ring can rotate around the inner ring through the activation of a two position soleinoid valve. In a first position of the valve, the small holes of the inner rings do not coincide with the small holes of the outer ring, shuting off the communication with the outside gas injection unit. In another position of the valve, the two sets of holes in the coaxial rings coincide opening the communication with the gas injection unit. In another variation of this embodiment, when the inner ring is in contact with the molten polymer, the small holes of the inner ring are plugged with sintered metal plugs. As can be appreciated by those skilled in the art, for each of the above mentioned embodiments allowing the practice of this invention, there are many different types of inlet and outlet nozzle which can be incorporated in the apparatus. The apparatus is not limited to any specific nozzle design or configuration.

In one typical example of practice of the present invention, gas is introduced in the mold cavity prior to injection of a molten plastic, where it is rapidly compressed and vibrated to acquire a specific state, resonant or progressive state or any other state, then melt is injected through a nozzle into that mold cavity via an injection molding equipment, resulting in the filling with molten plastic of the sprue, runners, gate and eventually the cavity area. The filling of the mold cavity with molten plastic results in the compression and/or push out of the gas already occupying the space there. The gas is let out in a controlled manner through at least one outlet connected to the mold cavity. In one preferred embodiment of the invention, the escaping gas is directed outward to meet and surround the incoming plastic melt, as it continues to be injected through the nozzle. The outlet for the gas is connected to a computer controlled relief valve which let the gas exit the mold cavity and decompress according to a predetermined sequence and program. A silencer is attached at the end of the exhaust. The controlled exhaust of the gas, while decompressing, and thus cooling, creates a thin compressed vibrating air jet jacket around the incoming plastic which alters the filling process, initially isolating the melt from directly touching the wall surfaces of the runners and mold cavity. The filling of the plastic in the mold can then be completed in several ways, depending on the type of article molded, whether hollow or full. For instance, in another embodiment of the invention, the filling of the plastic in the mold is completed by the rapid purge of all gas present through the activation of the vacuum system connected to another nozzle or other outlets. The molding process can then proceed with packing, cooling and demolding, all controlled from the injection molding equipment. In this embodiment the article molded is not hollow.

In a variation of the previous preferred embodiment of the invention, the remaining gas in the cavity is directed and concentrated near a specific location, for instance ahead of the gate, all the way up to the nozzle, such as to form a gas bubble there. The nozzle is connected to outside gas pressure control means. The gas bubble will form where the viscosity and pressure of the molten plastic are the lowest, which can be directed towards the runner, sprue and nozzle area. This can be accomplished through the combined effects of heating the runners to keep them hotter than the mold, focusing local vibrations through tubular resonators to where the gas bubble should be formed, and proper venting of all other areas in the cavity. The gas bubble is not coring out the part in this embodiment, which implies that the molded article is not hollow. According to this variation of this embodiment of the invention, controlled packing of the part is then provided by the control of the pressure within the gas bubble which is in contact with outside pressure control means. Shrinkage defects are eliminated by secondary packing on the air bubble as the solidifying article cools. By using gas as the secondary packing medium, the pressure drop normally associated with the freezing of the gate, resulting in shrinkage of the part, is eliminated. In one particularly important application of this embodiment of the invention, when internal stresses due to mold filling and thermal history before mold filling are undesirable, the pressure in the air bubble is decreased in a controlled way at a given temperature Ta of the cooling, such as to increase the mold cavity size at Ta, allowing the polymer to elastically expand from its compressed state. For amorphous polymers Ta is preferably located between $Tg+50$ and $Tg+100$, where Tg is the glass transition temperature. In another variation of this embodiment, the mold cavity can be simultaneously put into controlled vibration during filling and/or packing through the system of air channels located in the mold assembly outside and around the mold cavity. The air channels location is designed to alter the filling process and filling pattern and to impart a controlled vibration state to the mold assembly during cooling. The air channels are in communication with an outside source of pressure controlled vibrated air system which can be put into resonant states, progressive state, or any other state. The vibration of the air channels is interrupted at a specific temperature of the mold, before demolding the part. The gas pressure in the cavity is vented just prior to mold opening. Then the part is extracted from the mold. The manner in which the solid product is extracted depends, in part, upon the specific type of mold, molding process and/or molding apparatus.

In another embodiment of the invention, to produce hollow articles, the mold cavity is rapidly put in communication with a low pressure chamber to empty it almost completely of its air trapped after demolding of the part made in the previous cycle. This is done by closing the mold and opening the control valve of the gas injection manifold which connects the mold cavity to a low pressure chamber controlled by a vacuum unit. Simultaneously, the cavity is put into resonance either by vibrating the low pressure remaining gas through the resonators located in the mold assembly, and/or through the vibration of the network of air channels surrounding the mold cavity and specifically designed to impart a controlled vibration state to the mold assembly during filling, packing and cooling. The air channels are in communication with an outside source of pressure controlled vibrated air system which can be put into resonant states, progressive state or any other state. The mold cavity is then partially filled with plastic melt as short shot. Gas at a given state is introduced simultaneously and/or subsequently in the center of the plastic flow. The gas bubble created takes the path of least resistance which is altered and controlled by the vibration of the air channels in the mold assembly and/or by the state of vibration inside the gas injected. Furthermore, the state of the gas injected can be varied and regulated to specifically control the elasticity of the melt to strengthen it by visco-elastic effect during the primary gas penetration stage. This results in a smaller delay or no delay between the filling of the short shot and the injection of the gas bubble inside the plastic, and therefore no sink mark on the surface of the finished product.

In a preferred embodiment of this invention, packing pressure through the air bubble is controlled during cooling not only to compensate for shrinkage but also to apply the benefits described in any one of U.S. Pat. Nos. 4,150,079, 4,469,649, 4,288,398 and 3,298,065. This is done through the closed loop PID controlled pressure regulating system attached to the gas injection unit. Upon reading this specification, those skilled in the art will know what types of gas pressure PID control system can be used when practicing the invention.

Yet, in another preferred embodiment of the invention, the control of the air state in the air channels and/or of the gas state in the gas bubble, during packing and especially filling, which is a very fast process, is done with use of feed-forward technology using digital filtering of the input channels from the sensors and state transition methodology. Pressure, temperature and vibration probes are located in the mold assembly and in the gas and air injection units and are connected to transducers and a computer as part of the feed back control system. Upon reading this specification, those skilled in the art will know what types of feed-forward technology can be used when practicing the invention.

In another embodiment of the process according to the present invention, the air channel geometry and shape and the piping layout around the mold cavity, the gates, and the runners is specifically designed to impart a modification of the way the molten plastic fills the runners and the mold cavity, and how the mold cavity resonates. Furthermore, in the case of multi-cavity molds (not shown), for which cavity size is different for each cavity, the design of the air channels, their length, their location in the mold assembly, their cross section dimension and shape, and whether they are activated at the same time or sequentially, depending on the location of the section, with the same or different vibration energy, are all parameters adaptable to improve and modify the balance of flow during filling. The basic reason for this added flexibility is the influence of vibration on the throughput of molten plastic through channels and conduits. Air channels can assume round, triangular, rectangular or any other appropriate cross-sections. The piping network of air channels can assume various shapes, each appropriately adapted to alter the flow pattern during filling and to modify packing in order to improve the physical properties of the molded article. The network of air channels can be broken down into several small straight or curved sections connected through small remote controllable gates interposed at the junctions, which can be open or closed so as to activate a given section of the network by letting the air in or not in that section. The dimension and shape of the sections can vary, offering the maximum flexibility to the designer of the mold assembly. The shape of any given section can be straight, curved, helicoidal, spiral or any other appropriate shape. Upon reading this specification, those skilled in the art of flow and resonance of cavities, will know what types of design the air channel network should have when practicing the invention.

In another embodiment of the apparatus describing the invention, particularly adapted to the case of disk shaped mold cavity, the air channel consists of a disk shaped hollow metallic resonator which can slide in and lock into a slot designed in the mold assembly, at proximity to the mold cavity, and parallel to it, whereas the internal surface of the air channel disk resonator contains grooves and bulges specifically designed to impart a particular vibration pattern to the mold. In a variation of the previous embodiment, the hollow air channel resonator is not flat but assumes bent contour surfaces which remain parallel to the mold cavity surfaces in contact with the molten material. In a preferred application for this disclosed embodiment of the present invention, the polymer molded is Polycarbonate, or PMMA or Polystyrene, or an amorphous polyolefinic resin, particularly a cycloolefin copolymer from the metallocene based family of polyolefins, and the molded article is a lens, or a data storage disk such as a compact disk or a CD-ROM, or a video-disk, and/or any other similar transparent product requiring a control of birefringence for optical applications.

In another embodiment of the process according to the present invention, the gas used in at least the gas injection unit connected to the mold cavity is nitrogen. Yet, in another embodiment of the invention the gas is treated, for instance ionized, electrically charged and/or mixed with an ionized or electrically charged gas of the same or of a different chemical nature. This embodiment allows the molded plastic to be tagged with a specific chemical or electrically charge imprint, once demolded, which can be used for future control purposes, for recognition of the part and/or of the molder if the imprints is specific to the molder, and also for sorting purposes in recycling pre-treatments. In the case electrical charges are dispersed in the melt through contact with the vibrated gas, the characterization of certain electrical properties of the molded product, such as its spontaneous current discharge across structural or morphological transitions upon thermal stimulation, can be easily performed after the part is demolded to obtain the local internal stress concentration mapping of the part which relates to the molding parameters. The gas can also be mixed with an appropriate amount of another gas including volatile adjuvants susceptible to modify the melt behavior, its surface tension, viscosity under vibration, its ability to microcavitate and/or to nucleate crystals, and/or to form microfoams (foams with cells of microscopic dimensions), its ability to strengthen the gas bubble and decrease the likelihood of gas penetration into the compact regions, gas bubble fingering, bursting and its dispersion into smaller bubbles, weakening the part as crack initiators. In another embodiment of the invention, the gas is mixed with appropriate amounts of volatile chemicals such as UV stabilizers, anti-oxidants, flame retardants, anti-statics, surface agents and other volatile or reactive chemicals susceptible to have an impact on the properties of the article. The mixing of gases can occur at the beginning filling and/or at a specific later time during the molding of the article, chosen to achieve the desired objective. Upon reading this specification, those skilled in the art will know what types of volatile adjuvants and/or chemicals can be added to the gas used when practicing the invention. As an example of such practice of this characteristic of the invention, when the polymer molded is PMMA (poly-methyl methacrylate), the gas is mixed with appropriate amounts of vaporized acetonitrile aqueous solution in desired concentration of CH3CN, in order to increase the impact strength of the molded PMMA by reducing and/or eliminating the crazing mechanism and favoring plastic yielding during subsequent post-molding deformation of the article. In a preferred practice of this embodiment of the invention, the aqueous solution is 40% CH3CN and the percentage of nitrogen in the gas mixture is between 91% and 99%, preferably 95%.

In another embodiment of the molding process according to the present invention, the mold cavity is connected to at least two gas injection units through nozzles. The mold cavity is first filled with gas in a given state from one gas injection unit, typically a low pressure state, from 70 to 4,500 PSI, then the mold is injected with molten plastic from the injection molding nozzle, making sure that a gas bubble is created inside the cavity. This gas bubble acts as a gas cushion elastically pushing back any further penetration of the plastic melt in this area of the mold cavity and avoiding further penetration of the plastic into the gas. Gas in another state from the other injection unit, connected to a different nozzle, is quickly introduced after the injection of the molten polymer is completed, and/or simultaneously with it, as to create another gas bubble on the other side of the molten material. Each gas bubble is in communication with a gas injection unit, each monitored and controlled by the same computer. The computer program masterminds the coordination of gas pressure within the gas bubbles. When the pressure in the two gas bubbles is different, a differential of pressure exists between the two gas bubbles creating movement of the polymer melt in between. In this embodiment the regulated pressure of each gas control unit is such as to create an oscillation of the melt trapped between the two gas bubbles. This is easily performed by imposing the same sinusoidal pressure variation on the two gas bubbles, but with an out of phase shift difference between the two sinusoidal pressure signals. While the increase of pressure in one gas bubble causes the bubble to push the material towards the other gas bubble, the pressure regulated in this bubble decreases of the same amount, resulting in the shear orientation of the molten plastic material in between. The oscillation can be activated for a few seconds during the packing stage to cause beneficial orientational stretching effects in the part, especially in the case of Liquid Crystal Polymers, but equally importantly to orient fibers contained in the melt. It should be noted that, when the two pressure regulating signals operate at the same frequency, at the same amplitude and 3.14 radian out of phase with one another, the stress pattern does not generate any significant compressive force on the melt between the bubbles. Moreover, it has been discovered in other publications (U.S. Pat. No. 4,469,649, and application Ser. Nos. 08/124,147 and 08/138,673) that the morphological structure of the resulting solid product (e.g., percentage crystallinity, orientation, free volume content, texture, etc.), from which the physical properties depend (e.g., tensile strength, tensile modulus, etc.), can be modified by reciprocating the pressure signals in a manner which not only creates a shear stress on the melt, but also simultaneously generates a compressive force thereon. This can be achieved by an appropriate choice of the frequency, amplitude and phase difference of the two pressure signals. For instance, in preferred embodiments of the invention, the two sinusoidal functions regulating the pressure variation of each gas injection unit may be programmed to oscillate (a) at the same frequency, at a different amplitude and out of phase, (b) at the same frequency, at a different amplitude and in phase, (c) at a different frequency and at the same amplitude, (d) at a different frequency and at a different amplitude (e) at the same frequency, at the same amplitude and in phase, (f) at the same frequency, at the same amplitude and out of phase, and (g) at the same frequency, at the same amplitude and in phase. Moreover, the frequency, amplitude and/or phase shift of the drivable signals can remain constant, be variable and/or be intermittent throughout this melt oscillation process. All these variations of this embodiment of the invention can easily be programmed in the computer regulating the gas pressure in each bubble and are useful to combine the effect of a certain amount of compression at different stages of packing with the orientational effects induced by shear.

In one particularly important application of this embodiment of the invention when internal stresses due to mold filling and thermal history before mold filling are undesirable, the pressure in one or both of the air bubbles is decreased in a controlled way at a given temperature Ta of the cooling, preferably the pressure in the first formed gas bubble, such as to increase the mold cavity size, allowing the polymer to elastically expand from its compressed state. For amorphous polymers Ta is preferably located between Tg+50 and Tg+100, where Tg is the glass transition temperature. For semi-crystalline polymers, Ta is preferably between 0.92*Tm and Tm, where Tm is the melting temperature of the polymer (in Kelvin temperature). In one example of such a practice of this embodiment, the gas bubble first formed is rapidly burst and purged out by opening the valve of the gas injection unit communicating with the vacuum chamber, and the plastic melt continues to be controllably packed in the expanded cavity by regulating the pressure in the other gas bubble located near the sprue and nozzle area. A program in the computer dictates the state of the gas during this secondary packing, in particular it controls the variation of the average gas pressure when the temperature of the molded article reaches Tb, preferably chosen between Tg–25 and Tg+25 for amorphous polymers and between 0.88*Tm and 0.9*Tm, preferably 0.885*Tm, for semi-crystalline polymers such as Polypropylene, either decreasing the pressure rapidly or increasing the pressure rapidly at Tb, depending on the desired effect on the properties, as described in U.S. Pat. No. 4,150,079. The gas bubble is purged entirely just before demolding. In another variation of this embodiment, the mold cavity can be simultaneously put into controlled vibration during filling and/or packing through the system of air channels located in the mold assembly outside and around the mold cavity. The air channels location is designed to alter the filling process and filling pattern and to impart a controlled vibration state to the mold assembly during cooling. The air channels are in communication with an outside source of pressure controlled vibrated air system which can be put into resonant states, progressive state, or any other state. The vibration of the air channels is interrupted at a specific temperature of the mold, before demolding the part. The gas pressure in the cavity is vented just prior to mold opening. The part is then ejected. The manner in which the solid product is extracted depends, in part, upon the specific type of mold, molding process and/or molding apparatus.

As can be appreciated by those skilled in the art, for each of the above mentioned embodiments allowing the practice of this invention, there are many different combinations of vibration and pressure variation patterns for the gas from the injection unit(s) and/or for the air flowing through the air channels from the air injection unit. A given set of parameters defining the conditioning of all controlling signals during an injection molding cycle is herein defined as "a melt manipulation process file". Each file will modify the properties of the resulting product in its own specific manner. The preferred melt manipulation process file will depend, in part, upon the desired end results. After reading this specification, those skilled in the art will be able to determine the specific melt manipulation process file which best suits their needs through simple experimentation. For example, this can be done by noting the physical properties of a material serving as reference, which was molded in accordance with a particular melt manipulation process file and a particular temperature pattern. Then, subsequent materials are prepared in accordance with the present invention wherein one of the melt manipulation parameters (e.g., frequency and power for the ultrasonic excitations, pressure profile and in the case of oscillation, frequency, amplitude and/or phase shift and the variation of those parameters with time during the process) is changed while the temperature pattern and all other variables are maintained identical. By comparing the morphological structure and/or the physical properties of these subsequent molded articles with those of the first injection cycle, a skilled artisan can see how the variance of a specific parameter affects the particular material's morphological structure. This information can then used to determine how the melt manipulation process file must be modified in order to produce a product having the desired morphological structure and/or physical properties. Once the parameters have been established, the results can be easily reproduced by using the same melt manipulation process file under similar circumstances.

For example, by using density measurements, X-Ray diffraction, low frequency Raman spectroscopy, NMR spectroscopy, and thermal analysis techniques such as a Differential Scanning Calorimeter (DSC) and/or Thermal Stimulated Depolarization Current techniques, skilled artisans should note a significant difference in the density, morphology, texture, nanometric density fluctuation, specific heat traces and in the intensity of the depolarization current peaks. These differences are characteristic of structural and morphological changes occurring during the molding process. Moreover, skilled artisans should also note a significant difference in the relative positions of the melting temperature peaks, glass transition temperature peaks and secondary transitions peaks, as shown in thermal analysis. Furthermore, through such a thermal analysis of the resulting molded products, skilled artisans should observe that there is a significant difference in the intensity of the $Tg_{,}rau$ peak which demonstrate, for example, that the product prepared in accordance with the present invention has a free volume distribution which has been altered. Moreover, there are also many different temperature patterns which can be employed when practicing this invention. The mold can be cooled fast or slowly and/or cooled at certain location while heated at others. Each pattern will modify the properties of the resulting product in its own specific manner. The preferred temperature pattern will depend, in part, upon the desired end results. After reading the specification, those skilled in the art will be able to determine the specific temperature pattern which best suits their needs through simple experimentation. For example, this can be done by noting the physical properties of a material which was molded in accordance with a particular temperature pattern and a particular melt manipulation process file. Then, subsequent materials are prepared in accordance with the present invention wherein the temperature pattern is varied during the process while the melt manipulation process file and all other variables are maintained identical. By comparing the morphological structure and/or the physical properties of these subsequent materials with those of the reference material, a skilled artisan can see how the variance of the temperature pattern affects the particular material's morphological structure. This information can be used to determine how the temperature pattern must be modified in order to produce a product having the desired morphological structure and/or physical properties. Once the parameters have been established, the results can be easily reproduced by using the same temperature pattern under similar circumstances. Those skilled in the art, after reading this specification and U.S. Pat. Nos. 4,150,079, 4,469,649, 4,288,398 and 3,298,065, will be able to determine, given a certain temperature pattern, the optimum frequencies, vibration power, oscillation amplitude and the time sequence over which to exert the ultrasonic vibrations, the compressive low frequency packing force profile, and/or the shear stress in the case of orientational effects, which suits their specific needs. The time sequence determinations are based, in part, upon the temperature of the moldable material as measured by a suitable temperature sensing device (e.g., an infrared temperature sensing device). As indicated above, after reading this specification, all of these determinations can be made by those skilled in the art through the use of simple deductive experimentation and reasoning.

It is evident from the foregoing that various modifications, which are apparent to those skilled in the art, can be made to the embodiments of this invention without departing from the spirit or scope thereof.

That which is claimed is:

1. An apparatus for making a molded article comprising:
   (a) a mold assembly having at least one mold cavity, said mold assembly having at least one runner passage communicating with the said cavity through at least one gate for passage of a material which is molten and moldable, into the cavity, to form the molded article;
   (b) a feeder spaced from the mold and connected to the passage for preparing the material and for supplying the material to the cavity;
   (c) means for injecting the moldable material in the mold cavity at a controlled speed of injection and for pressurizing the moldable material in a controllable fashion;
   (d) at least one gas injection unit connected to the mold assembly for supplying gas having selected parameters, to the mold assembly, for influencing at least one of the molded article and the material in the cavity;
   (e) vibration means operatively connected to the mold assembly for creating vibration in the gas to place the gas in a resonant state, for modifying the influence of the gas on the at least one of the molded article and the material in the mold, the vibration having selected parameters;
   (f) means for controlling the temperature of the molten, moldable material contained within the mold cavity;
   (g) means for monitoring the temperature of the molten, moldable material contained within the mold cavity;
   (h) means for controlling the temperature of the gas connected to the mold assembly;
   (i) means for monitoring the temperature of the gas connected to the mold assembly;
   (j) means for varying in a controlled manner, the pressure of the gas being supplied to the mold assembly;
   (k) means for monitoring the pressure of the gas being supplied to the mold assembly; and
   (l) a closed loop regulating system for simultaneously controlling the selected parameters of the vibration, temperature and pressure variation of the gas of the gas injection unit and the parameters of molding the material in the mold cavity, the parameters including at least one of injection speed, packing pressure profile and material temperature.

2. An apparatus according to claim 1, wherein the mold assembly includes a nozzle in the passage, the gas injection unit being connected to the nozzle for injecting gas into the passage.

3. An apparatus according to claim 1, wherein the gas injection unit is connected to the feeder for injecting a dosed amount of gas into the molten material prior to its injection in the mold cavity.

4. An apparatus according to claim 1, including means incorporated in the gas inlet nozzle and communicating with the mold assembly or the feeder for ionizing or electrically charging the gas of the gas injection unit.

5. An apparatus according to claim 1, wherein the mold assembly includes at least one channel which is spaced from the mold cavity and is connected to the gas injection unit.

6. An apparatus according to claim 5, wherein the mold assembly includes a network of gas channels and cavities in the mold assembly, located around the mold cavity, the gate and the runner passage being structured to let a gas circulate and be compressed within the channels and cavities and communicating with the gas injection unit for supplying gas having selected parameters.

7. An apparatus according to claim 5, wherein a cross sectional area and shape of the gas channel are variable from one part of the mold assembly to another part of the mold assembly in order to modify a flow of gas in the parts of the mold assembly in a controlled manner to implement different treatments at different locations in the mold assembly.

8. An apparatus according to claim 5, wherein the gas channel cavity around the mold cavity, gate and runner passage contains stoppers, asperites and obstacles which define a direction of passage of the gas and a resonance frequency of the cavity.

9. An apparatus as recited in claim 1, wherein said gas injection unit comprises a valve which is movable from a first position to a second position such that:

(a) when said valve is in its first position, said gas is compressed and vibrated and is in communication with said mold assembly; and (b) when said valve is in its second position, said mold assembly is in communication with a controlled purging system.

10. An apparatus according to claim 1, wherein the vibration means includes at least one vibration resonator in a gas connection between the gas injection unit and the mold assembly.

11. An apparatus according to claim 1, wherein the vibration means includes at least one acoustic resonance chamber.

12. An apparatus according to claim 1, wherein the vibration means includes at least one piezo-electric resonator surface mounted near the gas channels in the mold cavity, so that gas bubble in the molten material, gas cavity orifices and surfaces located near the gate and the nozzle, are vibrated locally.

13. An apparatus as recited in claim 1 wherein said means for monitoring and said means for controlling the parameters identified in paragraphs (a) to (1) comprise: a central processing unit, temperature sensors interfaced in said apparatus and with said central processing unit, pressure sensors interfaced in said apparatus and with said central processing unit, and vibration sensors interfaced in said apparatus and with said central processing unit.

14. An apparatus as recited in claim 1, which further including means of monitoring a compressive force exerted by the gas introduced in the mold cavity on molten, moldable material contained within said mold cavity.

15. An apparatus as recited in claim 1, wherein said means for introducing a molten, moldable material into said mold cavity from said feeder, comprises an injection screw.

* * * * *